United States Patent

Hoffmann, Sr.

[11] Patent Number: 5,925,204
[45] Date of Patent: Jul. 20, 1999

[54] METHOD FOR REPAIRING A DAMAGED PORTION OF WALLBOARD

[75] Inventor: Dennis Hoffmann, Sr., McHenry, Ill.

[73] Assignee: ProPatch Systems, Inc., McHenry, Ill.

[21] Appl. No.: 08/954,240

[22] Filed: Oct. 20, 1997

[51] Int. Cl.[6] .................................................. B32B 35/00
[52] U.S. Cl. ........................ 156/98; 29/402.11; 52/514; 156/94; 428/63
[58] Field of Search ................................ 156/94, 98, 71; 52/514; 29/402.11; 428/63

[56] References Cited

U.S. PATENT DOCUMENTS

| | | | |
|---|---|---|---|
| 4,077,169 | 3/1978 | Thaw et al. | 52/741 |
| 4,122,222 | 10/1978 | Parker | 428/66 |
| 4,135,017 | 1/1979 | Hoffmann, Sr. | 52/514 |
| 4,311,656 | 1/1982 | Spriggs | 156/98 |
| 4,358,495 | 11/1982 | Parker | 428/66 |
| 4,406,107 | 9/1983 | Schoonbeck | 52/514 |
| 4,460,420 | 7/1984 | Estrada | 156/98 |
| 4,620,407 | 11/1986 | Schmid | 52/514 |
| 4,707,391 | 11/1987 | Hoffmann, Sr. | 428/63 |
| 4,776,906 | 10/1988 | Bernard | 156/85 |
| 5,269,861 | 12/1993 | Gilbreath | 156/98 |
| 5,298,099 | 3/1994 | Hoffmann, Sr. | 156/94 |
| 5,555,691 | 9/1996 | Nguyen | 52/514 |
| 5,556,688 | 9/1996 | Cox | 428/122 |
| 5,605,259 | 2/1997 | Clawson et al. | 222/402.23 |
| 5,620,768 | 4/1997 | Hoffmann, Sr. | 428/77 |

*Primary Examiner*—Daniel Stemmer
*Attorney, Agent, or Firm*—Baker & McKenzie

[57] ABSTRACT

An improved method is provided for repairing damaged portions of an exposed surface of wallboard. The method includes the steps of selecting a repair patch of sufficient area to surround the damaged portion of the exposed surface of the wallboard, positioning the repair patch on the exposed surface of the wallboard so that all of the edges of the repair patch surround the damaged portion, scoring a groove in the outer paper layer of the wallboard by moving a razor knife along all edges of the repair patch, removing the repair patch from the wallboard, peeling the outer paper layer of the wallboard within the area bounded by the groove away from the plaster layer of the wallboard, anchoring the repair patch to the visible surface of the plaster layer by suitable means so that all of the edges of the repair patch are within the area bounded by the groove, spreading a curable repair compound over the repair patch and the visible surface of the plaster layer so that the repair patch and the visible surface of the plaster layer are covered with repair compound, and allowing the repair compound to cure.

18 Claims, 2 Drawing Sheets

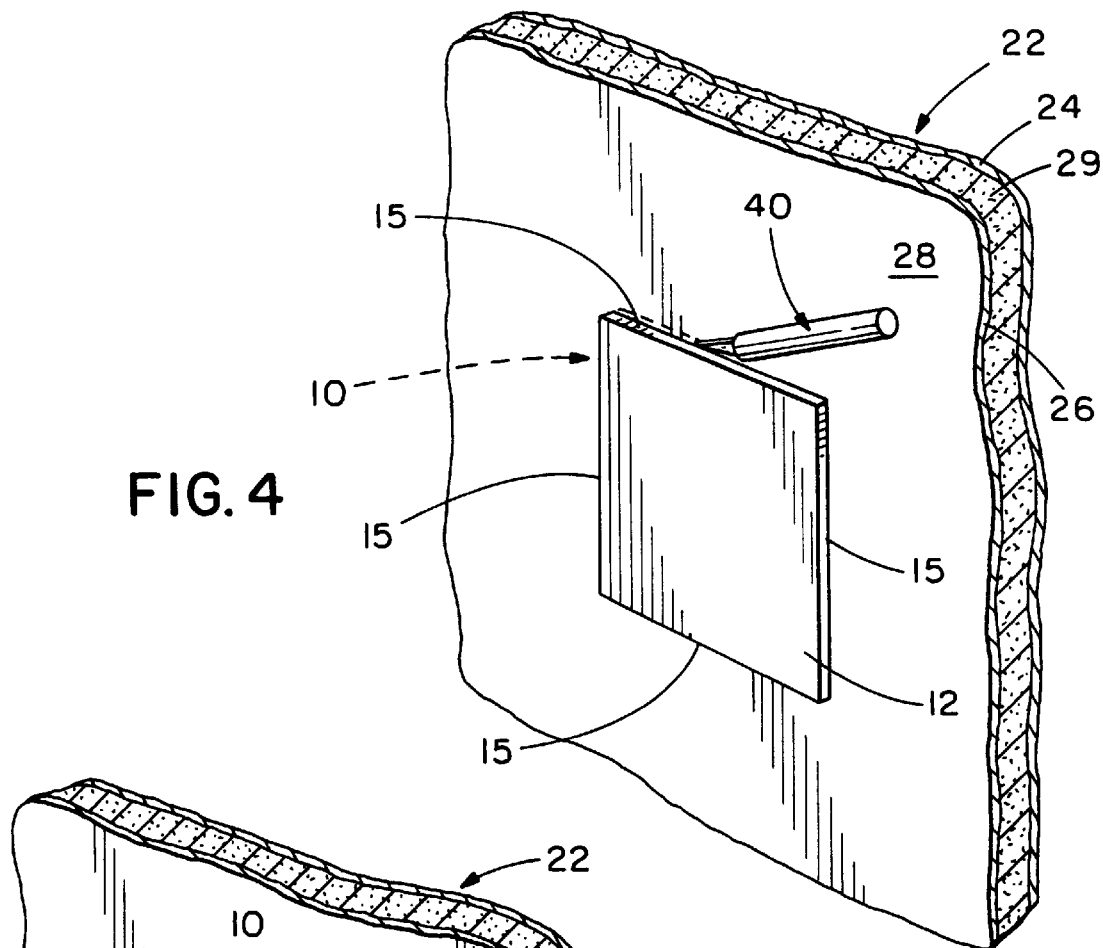
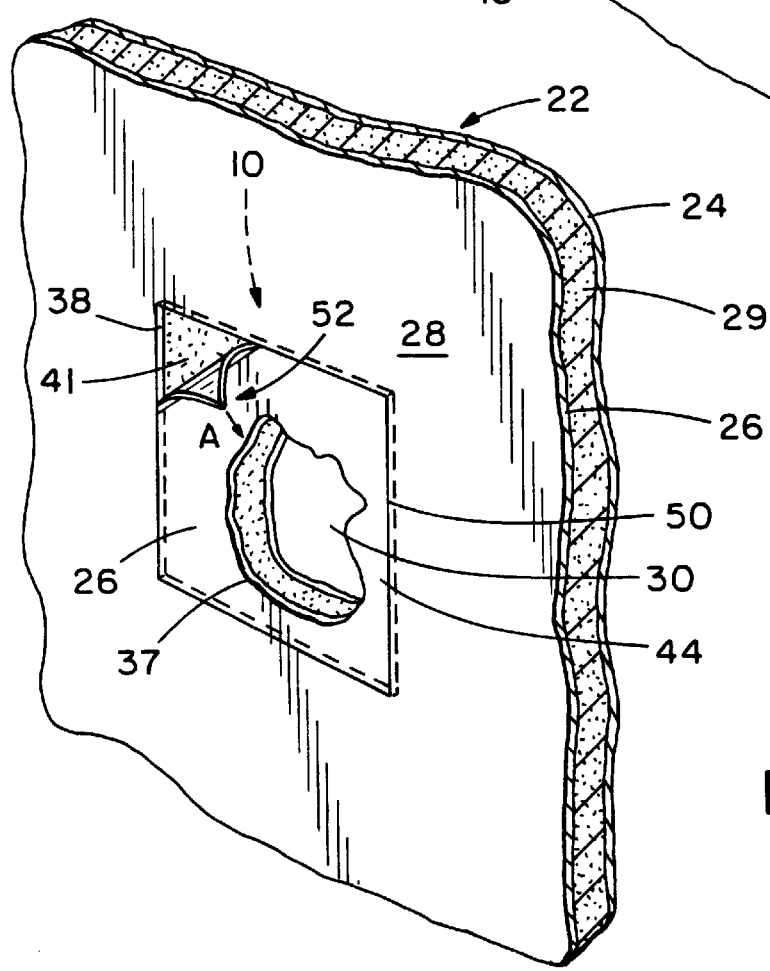

METHOD FOR REPAIRING A DAMAGED PORTION OF WALLBOARD

BACKGROUND OF THE INVENTION

1. Field of the Invention

This invention relates generally to an improved method for repairing wall structures and more specifically to a method for repairing damaged portions of wallboard.

2. Description of the Related Art

In modern day building construction, interior walls and partitions are often constructed of wallboard panels, which are generally referred to as drywall, gypsumboard, plasterboard, or Sheetrock®. Essentially, these panels are made of a hardened plaster-like gypsum material which is sandwiched between sheets of paper or paperboard.

In a typical building construction process, wooden studs are assembled to form a frame that outlines the dimensions of a room. Wallboard panels are then nailed or screwed to the studs to form a substantially flat wall or ceiling surface. Any indentations in the wallboard panels, such as those formed by driving nails into the wallboard, are filled in with drywall compound, a mud-like material, and the drywall compound is smoothed out with a flat-bladed tool such as a trowel or scraper. Additionally, the slight gaps at the junction lines between adjoining wallboard panels are typically taped over and drywall compound is applied over the tape. The drywall compound is then allowed to dry and harden. Optionally, the hardened drywall compound may be sanded to a smoother finish. Usually, a texture material is then applied to the entire wallboard surface to hide any other imperfections, and the entire surface is painted after the texture material has dried.

While the use of wallboard panels in building construction provides numerous advantages including ease of installation and relatively low cost, the use of these panels does present certain disadvantages. Namely, wallboard material is easily damaged by a blow applied to a portion of the surface. For example, the impact caused by a protruding door knob on a swinging door has been known to create an unsightly indentation in wallboard. In addition, it is not uncommon for wallboard to damaged when contacted by furniture being moved around a room.

Because damage to wallboard surfaces commonly occurs, various methods have been proposed for repairing the damaged portions of wallboard. For example, U.S. Pat. No. 4,620,407 discloses a method for repairing holes in drywall that involves placing a template around the damaged portion of the drywall, inserting a saw into a guide in the template, moving the saw along the length of the guide to circumscribe a cutout in the drywall, removing the cutout from the drywall, and replacing the cutout with a repair plug formed of drywall. A similar technique is disclosed in U.S. Pat. No. 5,269,861 which is directed to a drywall repair method wherein a repair plug is inserted into a cutout area in damaged drywall. While this type of drywall repair method should yield satisfactory results, it has the disadvantage of including the cumbersome step of preparing a repair plug that closely matches the cutout formed in the drywall.

It has also been suggested that damaged portions of drywall can be repaired by covering the damaged areas with a thin patch of material and applying a layer of drywall compound over the patch. U.S. Pat. Nos. 4,122,222 and 4,135,017 illustrate methods using this technique. These methods are quite effective and require very little specialized equipment. However, unskilled individuals using these methods may produce a repaired surface having a noticeable elevated surface portion. Therefore, it is believed that further improvements can be made in this type of drywall repair method so that the repaired drywall surface more closely resembles the original surface of the drywall.

Accordingly, there is a need for an improved method for repairing damaged portions of wallboard that will provide a repaired wallboard surface having the appearance and surface contours of the original surface of the wall.

It is therefore an object of the present invention to provide an improved method for repairing damaged portions of wallboard such as drywall, gypsumboard, plasterboard, or the like.

It is a further object of the present invention to provide an improved method for repairing damaged wallboard that provides a smooth transition between the wall surface and that of the wall repair compound used to complete the repair.

Yet another object of the present invention is to provide an improved method for repairing damaged wallboard such that the repaired surface conforms virtually perfectly with the surrounding wallboard surface.

Still another object of the present invention is to provide an improved method for repairing damaged wallboard wherein the location of a wallboard repair patch used in the repair method is not noticeable.

SUMMARY OF THE INVENTION

The present invention makes a significant contribution to the wallboard repair art by providing an improved method for repairing damaged portions of wallboard that satisfies the need for a wallboard repair method that produces a minimal transition between the wall surface and the hardened wall repair compound used to complete the repair such that the location of a wallboard repair patch used in the repair method is not noticeable. A method having the features of the present invention can be practiced in the following manner. First, a repair patch of sufficient area to surround the damaged portion of the exposed surface of the wallboard is selected. The repair patch is then positioned on the exposed surface of the wallboard so that all of the edges of the repair patch surround the damaged portion. A razor knife or similar cutting instrument is then moved along all edges of the repair patch. The razor knife scores a groove in the wallboard, the groove extending from the exposed surface of the wall board through an outer paper layer to the plaster layer of the wallboard. The groove in the wallboard defines the perimeter of a restoration area of the wallboard. The repair patch is then removed from the wallboard and set aside for further use.

The outer paper layer of the wallboard within the perimeter of the restoration area is then peeled away from the plaster layer. This creates a visible surface of the plaster layer within the restoration area. The repair patch is then anchored to the visible surface of the plaster layer by suitable means. The repair patch is anchored to the plaster layer so that all of the edges of the repair patch are within the perimeter of the restoration area. A curable repair compound is then spread over the repair patch and the visible surface of the plaster layer so that the repair patch and the visible surface of the plaster layer are covered with repair compound. The repair compound is contoured to the exposed surface of the wallboard and allowed to cure. The resulting surface may then be sanded and painted so as to conform to the appearance of the undamaged portions of the wallboard.

BRIEF DESCRIPTION OF THE DRAWINGS

These and other features, aspects, objects, and advantages of the present invention will be become better understood upon consideration of the following detailed description, appended claims and accompanying drawings where:

FIG. 4 is a perspective view of a section of drywall showing the use of a razor knife to cut a score line in an outer paper layer of the drywall and showing a drywall patch positioned so as to provide a cutting template for the razor knife; and FIG. 5 is a perspective view of a section of drywall showing the outer paper layer being peeled away from the drywall within the area defined by the score line cut with the razor knife.

Figure 1:
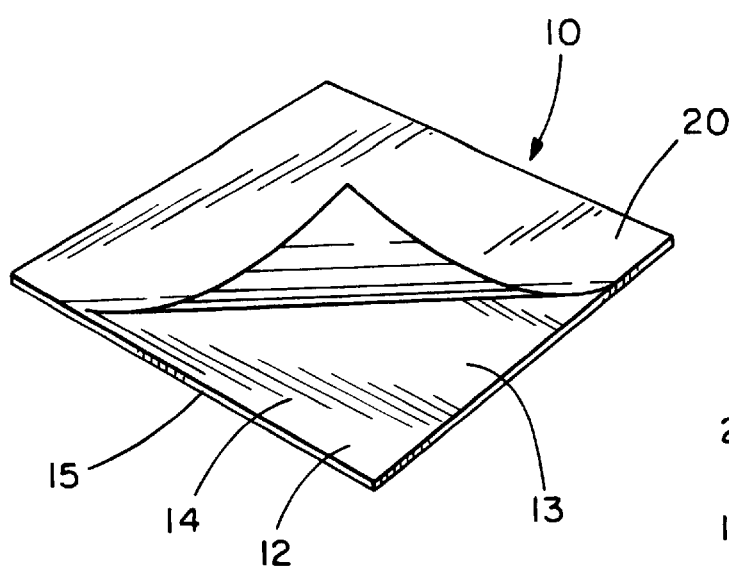
FIG. 1 is a perspective view of a drywall patch suitable for use in the method of the present invention, the patch including a thin plate having adhesive on the inner surface thereof and removable release paper, shown peeled partially away.

It should be understood that the drawings are not necessarily to scale and that the embodiments are sometimes illustrated by phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DESCRIPTION OF THE PREFERRED EMBODIMENTS

Referring now to FIG. 1, there is shown a drywall repair patch 10 suitable for use in the method of the present invention. The drywall patch 10 is formed from a thin and relatively rigid plate 12 which is made of a non-combustible material, preferably thin gauge aluminum sheeting. Most preferably, the aluminum sheeting has a thickness less than the thickness of the paper layers covering the plaster layer in commercially available drywall. Aluminum sheeting is most suitable because of its relatively light weight and because aluminum may be easily trimmed to size or may have a hole cut therein to accommodate and seal a pipe extending from the wall surface. Plate 12 has edges 15 and is covered on one side at least in part by a pressure sensitive adhesive coating 14 for firmly bonding plate 12 at its interior side 13 into intimate proximity to the wall surface to be repaired. A release coated film 20 may be applied over the adhesive coating 14. The film 20 is to be stripped away prior to use.

Figure 2:
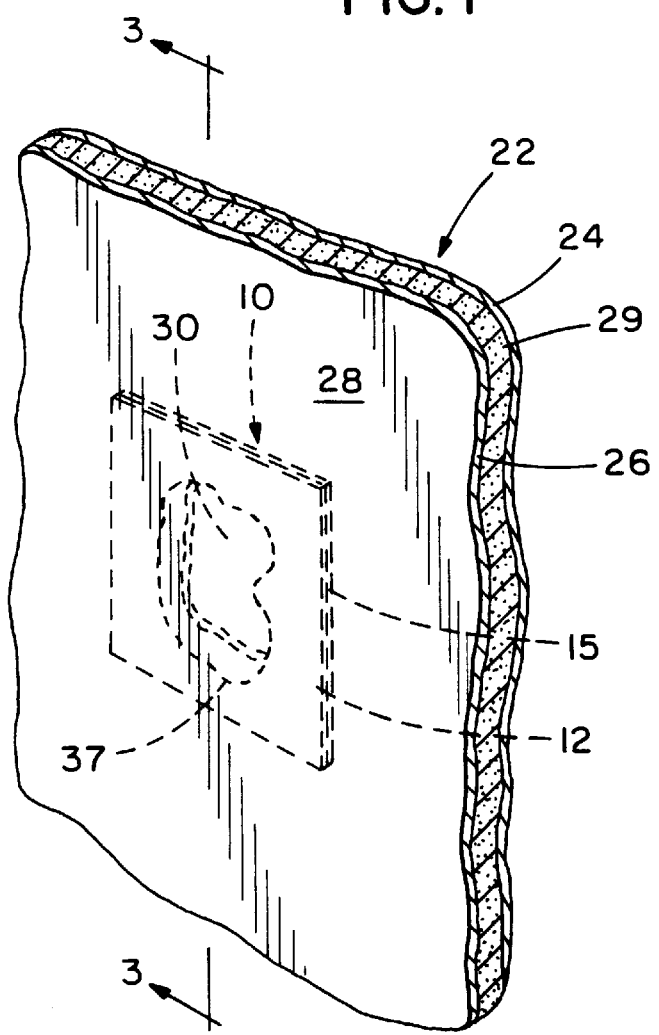
FIG. 2 is a perspective view of a section of drywall, showing in phantom lines the drywall patch disposed thereon and covering and repairing a hole in the drywall.

Referring now to FIG. 2, the drywall patch 10 is shown disposed on a section of drywall generally designated at 22. The drywall section 22 comprises a first outer paper layer 26 and a second outer paper layer 24 which sandwich a plaster layer 29. The first outer paper layer 26 has an outside surface 28 which is exposed when the drywall is installed on wooden studs. Plate 12 with edges 15 is shown in phantom covering a hole or opening 30 in the drywall to be repaired. The hole or opening 30 has a perimeter 37.

Figure 3:
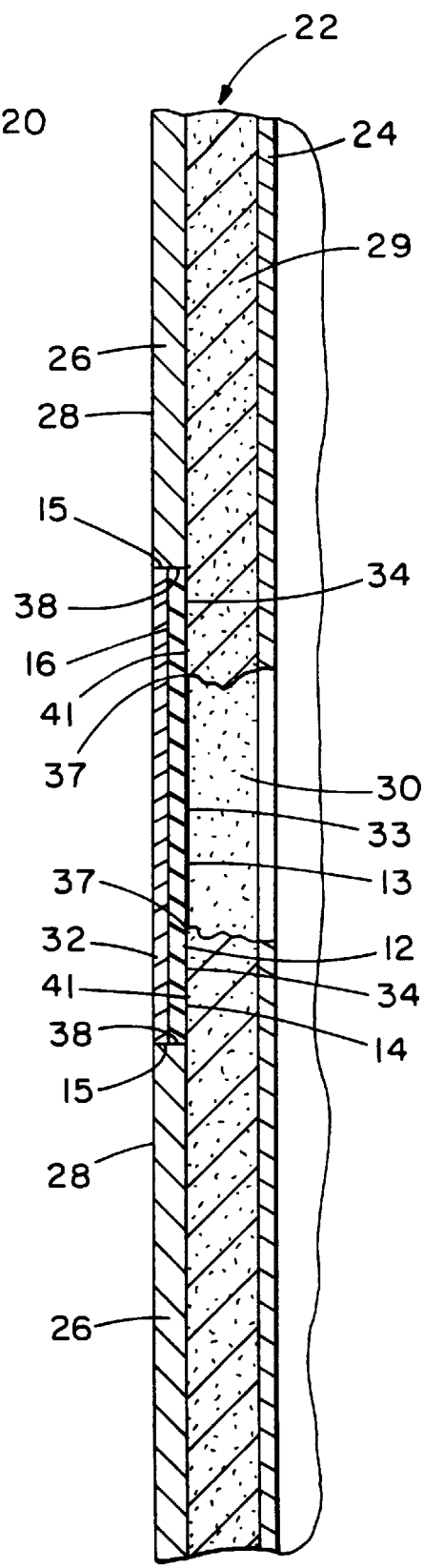
FIG. 3 is an enlarged cross-sectional view taken along line 3—3 of FIG. 2, showing the drywall patch applied to the exterior surface of the drywall to repair a hole therein, and further showing a wall repair compound, such as plaster of paris or spackling compound, applied over the entirety of the drywall patch to complete the repair.

Referring now to FIG. 3, the drywall patch 10 is shown applied to repair hole 30 in drywall section 22, and when installed is covered by a thin layer of plaster, spackle or other curable drywall repair compound 32. It can be seen that the drywall repair compound 32 is flush with outside surface 28 of first outer paper layer 26 of drywall section 22. It should be noted that the first outer paper layer 26 in FIG. 3 is shown in slightly enlarged scale in order to more clearly depict the features of the repaired drywall surface. Plate 12 has edges 15, an outer side 16, a central portion 33 on interior side 13 thereof for covering opening 30 in drywall section 22, and a periphery 34 on interior side 13 thereof for disposition into intimate proximity with an exposed surface 41 of plaster layer 29. Exposed surface 41 of the plaster layer 29 is bounded by the perimeter 37 of the hole 30 and interior edges 38 of first outer paper layer 26. Adhesive coating 14 is disposed on interior side 13 of plate 12 over at least a substantial portion of the periphery 34 and alternatively over the entire interior surface 13 of plate 12 for firmly bonding plate 12 to the exposed surface 41 of the plaster layer 29.

Referring now to FIGS. 1–5, the hole 30 in drywall section 22 can be repaired in accordance with the method of the present invention. First, a repair sheet having a side including an adhesive and a film covering the adhesive is selected for use in the method. The repair sheet is trimmed to form a repair patch 10 of sufficient area to surround the damaged portion of the exposed surface of the drywall. Preferably, the repair sheet is of a material and thickness such that the repair sheet can be trimmed to a convenient size with a scissors. Most preferably, the repair sheet is a metal such as aluminum. In an alternative embodiment of the method of the invention, a repair patch 10 may be selected from patches that have been conveniently precut to a predetermined size and shape. FIG. 1 shows an example of a repair patch 10 that is suitable for use in the method of the invention.

Referring now to FIGS. 4 and 5, the next steps in the method of the present invention are shown. After a repair patch 10 of a suitable size has been prepared or selected, the repair patch 10 is positioned on the outside surface 28 of the drywall section 22 so that all edges 15 of the repair patch 10 surround the damaged portion of the drywall section 22. The repair patch 10 is pressed against the outside surface 28 of the drywall section 22 in order to hold the repair patch 10 in position on the drywall section 22.

While the repair patch is being held in position on the drywall section 22, a razor knife 40 is moved along all edges 15 of the repair patch 10. Preferably, a portion of the blade of the razor knife remains in contact with the edges 15 of the repair patch 10 when the razor knife 40 is moved. When the razor knife is moved along the edges 15 of the repair patch 10, a groove is scored in the drywall section 22. The groove extends from the outside surface 28 of the first outer paper layer 26 of drywall section 22 through the first outer paper layer 26 to the plaster layer 29 of the drywall section 22. The groove defines the perimeter or borders 50 of a restoration area 44 of the drywall section 22. The repair patch 10 is then removed from the drywall section 22 and set aside for use in a subsequent step of the method.

After the groove has been scored in the drywall section 22 and the repair patch 10 has been removed from the drywall section 22, the first outer paper layer 26 is grasped within the perimeter 50 of the restoration area 44 and peeled away from the plaster layer 29 of the drywall section 22. This step of the process is shown in FIG. 5. It can be seen that a corner 52 of a portion of the first outer paper layer 26 that lies within the perimeter 50 of the restoration area 44 is grasped and pulled in direction 'A' away from the plaster layer 29 of the drywall section 22. Other corners of the first outer paper layer 26 that lie within the perimeter 50 of the restoration area 44 may also be grasped and peeled away from the drywall section 22. As the first outer paper layer 26 is peeled away from the drywall section 22, interior edges 38 of the first outer paper layer 26 and a visible, exposed surface 41 of the plaster layer 29 are formed. The peeling process is continued until substantially all of the first outer paper layer 26 within the perimeter 50 of the restoration area 44 has been peeled away from the plaster layer 29. Therefore, after the peeling process is complete, the outside surface of the drywall within the perimeter 50 of the restoration area 44 consists of a visible surface 41 of the plaster layer 29 of the drywall section 22.

The repair patch 10 is then grasped and the film 20 covering the adhesive coating 14 on a side of the repair patch 10 is removed. The adhesive coated side of the repair patch in then placed in contact with the visible surface 41 of the plaster layer 29 so that all edges 15 of the repair patch 10 are within the perimeter 50 of the restoration area 44. Pressure is applied to the repair patch 10 so as to anchor the repair patch 10 to the visible surface 41 of the plaster layer 29 of the drywall section 22.

A curable repair compound 32, such as plaster of paris, gypsum material, spackling compound, joint compound or the like, is then spread over the repair patch 10 and over any portion of the visible surface 41 of the plaster layer 29 that remains in view after the visible surface 41 of the plaster layer 29 is covered by the repair patch 10. The repair compound 32 is then contoured with a flat-bladed tool so as to blend into the outside surface 28 of the drywall section 22. Preferably, the repair compound is contoured so that it is substantially smooth and planar with the outside surface 28 of the drywall section 22. It can be appreciated that only a small amount of repair compound is required in the method of the invention in order to cover the repair patch 10 and exposed surface 41 of the plaster layer 29. In contrast, other prior methods often require building up and finishing a number of layers of finishing compound. After the repair compound has been contoured to the outside surface 28 of the drywall section 22, the repair compound is allowed to cure. Optionally, outer surface portions of the repair compound may be sanded to obtain a desired surface finish after the repair compound has been cured.

Various advantageous modifications of the method of the present invention are also possible. For example, the repair sheet or repair patch can be selected so that the thickness of the repair patch is less than the thickness of the first outside paper layer of the drywall section. In this version of the method, the outer side 16 of the repair patch 10 will not extend outwardly beyond the plane of the outside surface 28 of the drywall section 22 when the repair patch 10 is placed in contact with the visible surface 41 of the plaster layer 29. Consequently, when repair compound is spread over the repair patch, it will be easier to contour the repair compound so that it is substantially smooth and planar with the outside surface of the drywall section as the edge of a flat-bladed tool can remain in contact with the outside surface of the drywall section when the repair compound is contoured. FIG. 3 shows a drywall section repaired using this version of the method. It can be seen that the outer side 16 of the repair patch 10 does not extend outwardly beyond outside surface 28 of the first outer paper layer 26 and that the drywall repair compound 32 is flush with outside surface 28 of first outer paper layer 26 of drywall section 22. It can be appreciated that a flat, i.e. not bulging, surface can be very easily obtained in the method of the present invention when using a repair patch 10 of a thickness less than the thickness of the first outer paper layer 26 of the drywall 22. The result of this version of the method is a repaired area providing no noticeable repair patch.

In another version of the method of the invention, the repair patch or sheet is formed from a thin gauge metal such as aluminum that can be trimmed to shape using a common household tool such as a scissors. This allows the user to prepare a repair patch that is only slightly large than the damaged portion of the wallboard. By using a smaller repair patch, the user limits the amount of paper that must by peeled away from the plaster and also minimizes the amount of repair compound that must be applied to the repair patch. In addition, the use of a metal repair patch in the method of the present invention is particularly advantageous as the repaired surface will not easily deform if it is struck.

The method of the present invention is also advantageous as it may be used to repair a variety of different types of holes in a wall surface, including for example, the hole around a pipe disposed through and projecting from the wall surface, a hole caused by wall damage, a mis-cut switch plate hole or light fixture hole.

Thus, it is seen that an improved method for repairing damaged portions of wallboard is provided. The method produces a repaired wallboard surface having the appearance and surface contours of the original surface of the wall. A smooth transition between the wallboard surface and that of the wall repair compound used to complete the repair is achieved such that the repaired surface conforms virtually perfectly with the surrounding wallboard surface. Also, the location of a wallboard repair patch used in the repair method is not noticeable.

Although the present invention has been described in detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A method for repairing a damaged portion of an exposed surface of wallboard, the wallboard having a first outer paper layer and a second outer paper layer sandwiching a plaster layer, the method comprising the steps of:

selecting a repair patch of sufficient area to surround the damaged portion of the exposed surface of the wallboard, the repair patch having a thickness less than the thickness of the first outer paper layer;

positioning the repair patch on the exposed surface of the wallboard so that all edges of the repair patch surround the damaged portion;

moving a cutting means along all edges of the repair patch thereby scoring a groove in the wallboard, the groove extending from the exposed surface through the first outer paper layer to the plaster layer of the wallboard, the groove defining a restoration area of the wallboard;

removing the repair patch from the wallboard;

peeling the first outer paper layer within the perimeter of the restoration area away from the plaster layer thereby creating a visible surface of the plaster layer within the restoration area;

anchoring the repair patch to the visible surface of the plaster layer so that all edges of the repair patch are within the perimeter of the restoration area;

spreading a curable repair compound over the repair patch and the visible surface of the plaster layer so as to cover the repair patch and the visible surface of the plaster layer;

contouring the repair compound to the exposed surface of the wallboard; and allowing the repair compound to cure.

2. The method of claim 1 wherein the repair compound is contoured so that the repair compound is substantially smooth and planar with the exposed surface of the wallboard.

3. The method of claim 2 further comprising the step of:

sanding outer surface portions of the repair compound after the repair compound has cured to obtain a desired surface finish.

4. The method of claim 1 wherein the cutting means contacts the edges of the repair patch when the cutting means is moved.

5. The method of claim 4 wherein the cutting means is a razor knife.

6. The method of claim 1 wherein the curable repair compound is selected from the group consisting of plaster of paris, gypsum material, spackling compound and joint compound.

7. The method of claim 1 wherein one side of the repair patch includes an adhesive for anchoring the repair patch to the visible surface of the plaster layer.

8. The method of claim 1 wherein the repair patch is metallic and is trimable to a selected shape by means of a scissors.

9. A method for repairing a damaged portion of an exposed surface of wallboard, the wallboard having a first outer paper layer and a second outer paper layer sandwiching a plaster layer, the method comprising the steps of:

selecting a repair sheet having a side including an adhesive and a film covering the adhesive, the repair sheet having a thickness less than the thickness of the first outer paper layer;

trimming the repair sheet to form a repair patch of sufficient area to surround the damaged portion of the exposed surface of the wallboard;

positioning the repair patch on the exposed surface of the wallboard so that all edges of the repair patch surround the damaged portion;

moving a cutting means along all edges of the repair patch thereby scoring a groove in the wallboard, the groove extending from the exposed surface through the first outer paper layer to the plaster layer of the wallboard, the groove defining a restoration area of the wallboard;

removing the repair patch from the wallboard;

peeling the first outer paper layer within the perimeter of the restoration area away from the plaster layer thereby creating a visible surface of the plaster layer within the restoration area;

removing the film from the repair patch;

placing the adhesive coated side of the repair patch in contact with the visible surface of the plaster layer so that all edges of the repair patch are within the perimeter of the restoration area thereby anchoring the repair patch to the visible surface of the plaster layer;

spreading a curable repair compound over the repair patch and the visible surface of the plaster layer so as to cover the repair patch and the visible surface of the plaster layer;

contouring the repair compound to the exposed surface of the wallboard so that the repair compound is substantially smooth and planar with the exposed surface of the wallboard; and allowing the repair compound to cure.

10. The method of claim 9 further comprising the step of:

sanding outer surface portions of the repair compound after the repair compound has cured to obtain a desired surface finish.

11. The method of claim 9 wherein the cutting means contacts the edges of the repair patch when the cutting means is moved.

12. The method of claim 11 wherein the cutting means is a razor knife.

13. The method of claim 9 wherein the curable repair compound is selected from the group consisting of plaster of paris, gypsum material, spackling compound and joint compound.

14. The method of claim 9 wherein the repair sheet is metallic and is trimable to a repair patch by means of a scissors.

15. The method of claim 14 wherein the repair sheet is aluminum.

16. A method for repairing a damaged portion of an exposed surface of wallboard, the wallboard having a first outer paper layer and a second outer paper layer sandwiching a plaster layer, the method comprising the steps of:

selecting a repair sheet having a side including an adhesive and a film covering the adhesive, the repair sheet having a thickness less than the thickness of the first outer paper layer;

trimming the repair sheet to form a repair patch of sufficient area to surround the damaged portion of the exposed surface of the wallboard;

positioning the repair patch on the exposed surface of the wallboard so that all edges of the repair patch surround the damaged portion;

moving a cutting means along all edges of the repair patch, the cutting means remaining in contact with the edges of the repair patch when the cutting means is moved, thereby scoring a groove in the wallboard, the groove extending from the exposed surface through the first outer paper layer to the plaster layer of the wallboard, the groove defining a restoration area of the wallboard;

removing the repair patch from the wallboard;

peeling the first outer paper layer within the perimeter of the restoration area away from the plaster layer thereby creating a visible surface of the plaster layer of the wallboard within the restoration area;

removing the film from the repair patch;

placing the adhesive coated side of the repair patch in contact with the visible surface of the plaster layer so that all edges of the repair patch are within the perimeter of the restoration area thereby anchoring the repair patch to the visible surface of the plaster layer;

spreading a curable repair compound selected from the group consisting of plaster of paris, gypsum material, spackling compound and joint compound over the repair patch and the visible surface of the plaster layer so as to cover the repair patch and the visible surface of the plaster layer;

contouring the repair compound to the exposed surface of the wallboard so that the repair compound is substantially smooth and planar with the exposed surface of the wallboard;

allowing the repair compound to cure; and sanding outer surface portions of the repair compound has cured to obtain a desired surface finish.

17. The method of claim 16 wherein the repair sheet is metallic and is trimable to a repair patch by means of a scissors.

18. The method of claim 17 wherein the repair sheet is aluminum.

\* \* \* \* \*